US012665270B2

(12) United States Patent
Matsumura et al.

(10) Patent No.: US 12,665,270 B2
(45) Date of Patent: Jun. 23, 2026

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Nobuyuki Matsumura, Osaka (JP); Shinichi Takase, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 507 days.

(21) Appl. No.: 18/279,294

(22) PCT Filed: Feb. 28, 2022

(86) PCT No.: PCT/JP2022/008201
§ 371 (c)(1),
(2) Date: Aug. 29, 2023

(87) PCT Pub. No.: WO2022/196319
PCT Pub. Date: Sep. 22, 2022

(65) Prior Publication Data
US 2024/0170813 A1 May 23, 2024

(30) Foreign Application Priority Data
Mar. 19, 2021 (JP) ................................. 2021-046126

(51) Int. Cl.
*H01M 50/55* (2021.01)
*H01M 50/209* (2021.01)
(Continued)

(52) U.S. Cl.
CPC ......... *H01M 50/55* (2021.01); *H01M 50/209* (2021.01); *H01M 50/507* (2021.01); *H01M 50/533* (2021.01); *H01M 50/569* (2021.01)

(58) Field of Classification Search
None
See application file for complete search history.

(56) References Cited

U.S. PATENT DOCUMENTS

2015/0137824 A1   5/2015   Nishihara
2016/0172650 A1   6/2016   Ichikawa et al.
(Continued)

FOREIGN PATENT DOCUMENTS

JP      2016-115543      6/2016
JP      2020-013655      1/2020
(Continued)

OTHER PUBLICATIONS

International Search Report issued in WIPO Patent Application No. PCT/JP2022/008201, dated Apr. 5, 2022, along with an English translation thereof.

*Primary Examiner* — Tracy M Dove
(74) *Attorney, Agent, or Firm* — Greenblum & Bernstein. P.L.C.

(57) ABSTRACT

A wiring module is attached to a plurality of power storage devices, electrode terminals of the plurality of power storage devices being arranged in two rows continuously in an aligning direction of the plurality of power storage devices, and the two rows of electrode terminals being separated from each other in a separation direction orthogonal to the aligning direction, the wiring module including: a single substrate that is flexible and has a plurality of first voltage detection lines and a plurality of second voltage detection lines on only one surface thereof, and a connector, the substrate includes: a first connection piece that includes ends on one side of the first voltage detection lines, a second (Continued)

connection piece that includes ends on one side of the second voltage detection lines, and a connector connection piece.

7 Claims, 9 Drawing Sheets

(51) Int. Cl.
  *H01M 50/298*      (2021.01)
  *H01M 50/507*      (2021.01)
  *H01M 50/533*      (2021.01)
  *H01M 50/569*      (2021.01)

(56)             References Cited

U.S. PATENT DOCUMENTS

| | | | |
|---|---|---|---|
| 2016/0268577 A1* | 9/2016 | Ichikawa | H01M 50/209 |
| 2020/0006814 A1* | 1/2020 | Oota | H01M 10/482 |
| 2020/0020912 A1 | 1/2020 | Ota | |
| 2020/0020919 A1 | 1/2020 | Makino | |
| 2021/0251069 A1 | 8/2021 | Tomita et al. | |

FOREIGN PATENT DOCUMENTS

| | | |
|---|---|---|
| JP | 2020-013829 | 1/2020 |
| JP | 2021-125402 | 8/2021 |
| WO | 2014/024452 | 2/2014 |

* cited by examiner

FIG. 5

WIRING MODULE

TECHNICAL FIELD

The present disclosure relates to a wiring module.

BACKGROUND ART

A wiring module that is attached to a plurality of power storage devices is conventionally known. In the wiring module, a plurality of voltage detection lines are provided on a flexible substrate. The plurality of voltage detection lines are electrically connected to electrode terminals of the power storage devices. The plurality of voltage detection lines are connected to a device, and the voltages of the power storage devices are detected by the device. As such a wiring module, the wiring module disclosed in International Publication No. 2014/024452 (Patent Document 1 below) is known, for example.

CITATION LIST

Patent Documents

Patent Document 1: International Publication No. 2014/024452

SUMMARY OF INVENTION

Technical Problem

Positive and negative electrode terminals of each power storage device may be formed separated from each other at two end portions in the width direction of the power storage device. Furthermore, as a result of a plurality of power storage devices being connected in series or in parallel, the potentials of the electrode terminals may differ for each power storage device in a complicated manner. In such a case, in the wiring module attached to the plurality of power storage devices, voltage detection lines respectively connected to the electrode terminals may be aligned in an order that is different from the order of the potentials of the electrode terminals connected to the voltage detection lines (see FIG. 4 of Patent Document 1).

On the other hand, there are cases where, inside the device that detects the voltages of the power storage device, terminals of a circuit or a microcomputer for detecting the voltages are formed in the order of potential. In view of this, it is conceivable to rearrange, in the order of potential, the voltage detection lines that are arranged irrespective of potential.

It is conceivable to use jumper wires in order to arrange, on a flexible substrate, voltage detection lines in the order of potential, for example. However, this technique increases the number of components and wiring complexity, and may thus increase the manufacturing cost of the wiring-module.

Solution to Problem

A wiring module according to the present disclosure is a wiring module that is attached to a plurality of power storage devices, electrode terminals of the plurality of power storage devices being arranged in two rows continuously in an aligning direction of the plurality of power storage devices, and the two rows of electrode terminals being separated from each other in a separation direction that is orthogonal to the aligning direction, the wiring module including: a single substrate that is flexible and has a plurality of first voltage detection lines and a plurality of second voltage detection lines on only one surface thereof, and a connector, the substrate includes: a first connection piece that includes ends on one side of the first voltage detection lines that are electrically connected to electrode terminals that form one row of the two rows of electrode terminals, a second connection piece that includes ends on one side of the second voltage detection lines that are electrically connected to electrode terminals that form the other row of the two rows, and a connector connection piece that includes ends on the other side of the first voltage detection lines and ends on the other side of the second voltage detection lines that are electrically connected to the connector, and is disposed between the first connection piece and the second connection piece, the ends on the other side of the first voltage detection lines are aligned in the separation direction in an order of potentials of the electrode terminals electrically connected thereto via the first voltage detection lines, the ends on the other side of the second voltage detection lines are aligned in the separation direction in an order of potentials of the electrode terminals electrically connected thereto via the second voltage detection lines, either the plurality of first voltage detection lines or the plurality of second voltage detection lines are folded once on the connector connection piece, and the first voltage detection lines and the second voltage detection lines are connected to the connector from the same side in the aligning direction.

Advantageous Effects of Invention

According to the present disclosure, it is possible to provide a wiring module in which voltage detection lines are arranged in the order of potential, at a low cost.

BRIEF DESCRIPTION OF DRAWINGS

FIG. 5 is an enlarged plan view of the substrate showing a temperature measuring piece fold portion.

DESCRIPTION OF EMBODIMENTS

Description of Embodiments of Present Disclosure

Figure 1:
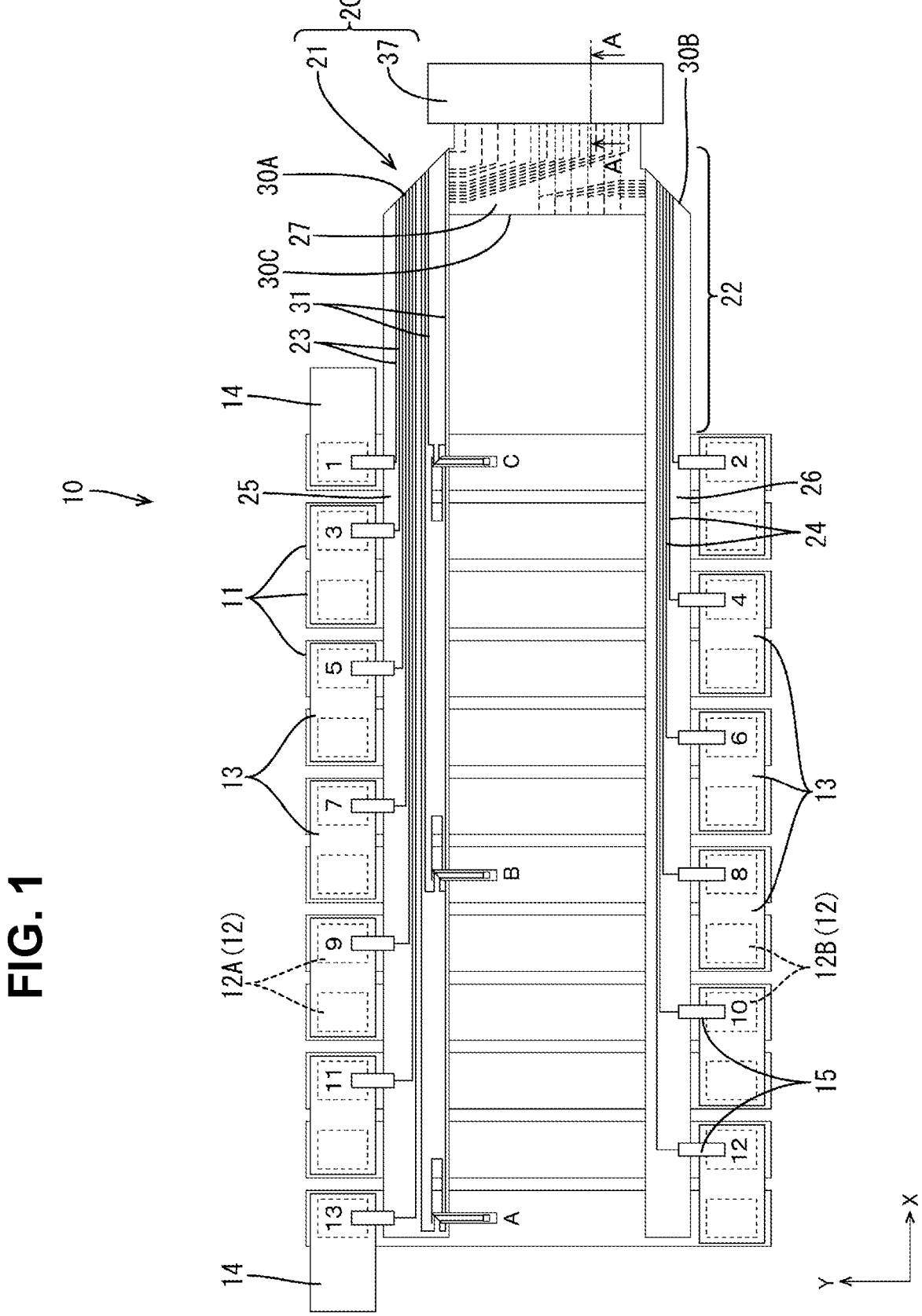
FIG. 1 is a plan view of a power storage module according to a first embodiment.

First, aspects of the present disclosure will be listed and described.

(1) A wiring module according to the present disclosure is a wiring module that is attached to a plurality of power storage devices, electrode terminals of the plurality of power storage devices being arranged in two rows continuously in an aligning direction of the plurality of power storage devices, and the two rows of electrode terminals being separated from each other in a separation direction that is orthogonal to the aligning direction, the wiring module including: a single substrate that is flexible and has a plurality of first voltage detection lines and a plurality of second voltage detection lines on only one surface thereof, and a connector, the substrate includes: a first connection piece that includes ends on one side of the first voltage detection lines that are electrically connected to electrode terminals that form one row of the two rows of electrode terminals, a second connection piece that includes ends on one side of the second voltage detection lines that are electrically connected to electrode terminals that form the other row of the two rows, and a connector connection piece that includes ends on the other side of the first voltage detection lines and ends on the other side of the second voltage detection lines that are electrically connected to the connector, and is disposed between the first connection piece and the second connection piece, the ends on the other side of the first voltage detection lines are aligned in the separation direction in an order of potentials of the electrode terminals electrically connected thereto via the first voltage detection lines, the ends on the other side of the second voltage detection lines are aligned in the separation direction in an order of potentials of the electrode terminals electrically connected thereto via the second voltage detection lines, either the plurality of first voltage detection lines or the plurality of second voltage detection lines are folded once on the connector connection piece, and the first voltage detection lines and the second voltage detection lines are connected to the connector from the same side in the aligning direction.

With such a configuration, since the substrate has the plurality of first voltage detection lines and the plurality of second voltage detection lines on only one surface thereof, a flexible substrate that has conductive paths formed on only one surface thereof can be used as the substrate, and it is possible to reduce the manufacturing cost of the wiring module. On the connector connection piece, either the plurality of first voltage detection lines or the plurality of second voltage detection lines are folded once, and thus the ends on the other side of the first voltage detection lines and the ends on the other side of the second voltage detection lines can be aligned in the separation direction in the order of potentials of the electrode terminals to which the first voltage detection lines and the second voltage detection lines are respectively connected.

(2) At least one of the first connection piece and the second connection piece may be folded once or more.

(3) The first connection piece and the second connection piece may be folded the same number of times.

With such a configuration, there are cases where the shape of the substrate can be easily controlled while suppressing the manufacturing cost of the substrate.

(4) Preferably, the surface of the substrate on which the ends on the other side of the first voltage detection lines are disposed and the surface of the substrate on which the ends on the other side of the second voltage detection lines are disposed face each other.

With such a configuration, the substrate can be easily mounted to the connector.

(5) Preferably, the connector includes first terminals that are respectively connected to the ends on the other side of the first voltage detection lines and second terminals that are respectively connected to the ends on the other side of the second voltage detection lines, the first terminals are aligned in a row in the separation direction, and the second terminals are disposed at positions different from the first terminals in a direction orthogonal to the aligning direction and the separation direction, and are aligned in a row in the separation direction.

With such a configuration, the size of the connector can be reduced in the separation direction.

(6) Preferably, the connector includes first terminals that are connected to the ends on the other side of the first voltage detection lines, and second terminals that are connected to the ends on the other side of the second voltage detection line, the first terminals and the second terminals are aligned in a row in the separation direction, and the first terminals and the second terminals are alternately disposed in the separation direction, and are aligned in an order of potential.

With such a configuration, the size of the connector can be reduced in a direction orthogonal to the aligning direction and the separation direction.

(7) Preferably, the wiring module includes a protector that protects the substrate.

With such a configuration, it is possible to protect the substrate.

Details of Embodiments of Present Disclosure

Embodiments of the present disclosure will be described below. The present disclosure is not limited to these examples, but is defined by the claims and intended to include all modifications within the meaning and scope equivalent to the claims.

First Embodiment

A first embodiment of the present disclosure will be described with reference to FIGS. 1 to 8. A power storage module 10 that includes a wiring module 20 according to the present embodiment is mounted in a vehicle such as an electric automobile, a hybrid automobile, or the like, as a power source for driving the vehicle. In the following description, the direction indicated by the arrow Z is regarded as the upward direction, the direction indicated by the arrow X is regarded as the forward direction, and the direction indicated by the arrow Y is regarded as the leftward direction. Note that only some of the same members are given reference numerals, and reference numerals of the other members may be omitted.

Power Storage Devices

As shown in FIG. 1, in the power storage module 10, a plurality of (in the present embodiment, 12) power storage devices 11 are aligned in the front-rear direction (an example of an aligning direction). The power storage devices 11 each have a rectangular shape. An unshown power storage element is housed inside each power storage device 11. The power storage devices 11 are not particularly limited, and may be secondary batteries or capacitors. The power storage devices 11 according to the present embodiment are secondary batteries.

Electrode Terminals

As shown in FIG. 1, electrode terminals 12 are formed on the left and right end portions of the upper surface of each of the power storage devices 11. One of the electrode terminals 12 is a positive electrode, and the other is a negative electrode. On the plurality of power storage devices 11, the electrode terminals 12 are arranged in two rows in the front-rear direction, and the two rows of electrode terminals 12 are separated from each other in the left-right direction (an example of a separation direction). Electrode terminals 12 that form one row of the two rows are referred to as "first electrode terminals 12A", and are disposed on the left side of the plurality of power storage devices 11. Electrode terminals 12 that form the other row of the two rows are referred to as "second electrode terminals 12B", and are disposed on the right side of the plurality of power storage devices 11. Connection bus bars 13 and output bus bars 14 are electrically connected to the first electrode terminals 12A. Connection bus bars 13 are electrically connected to the second electrode terminals 12B.

The connection bus bars 13 and the output bus bars 14 are obtained by pressing metal plates into predetermined shapes. A suitable metal such as copper, a copper alloy, aluminum, or an aluminum alloy can be appropriately selected as the metal used to form the metal plates. An unshown plating layer may be formed on the surfaces of the connection bus bars 13 and the output bus bars 14. A suitable metal such as tin, nickel, or solder can be selected as the metal for forming the plating layer.

As shown in FIG. 1, each connection bus bar 13 is connected to electrode terminals 12 that are adjacent to each other in the front-rear direction so as to bridge the electrode terminals 12. Each output bus bar 14 is connected to one electrode terminal 12 and outputs power to an external device. There are two output bus bars 14 in the present embodiment, one being connected to the first electrode terminal 12A of the rearmost power storage device 11 and the other being connected to the first electrode terminal 12A of the frontmost power storage device 11. In the present embodiment, five connection bus bars 13 each connect first electrode terminals 12A that are adjacent to each other, and six connection bus bars 13 each connect second electrode terminals 12B that are adjacent to each other. The plurality of power storage devices 11 are connected in series by these connection bus bars 13.

The electrode terminals 12 can be electrically connected to the output bus bars 14 and the connection bus bars 13 by employing a known technique such as soldering, welding, or bolting.

In FIG. 1, numerals "1" to "13" appended to the connection bus bars 13 and the output bus bars 14 indicate the ranks of the potentials of the electrode terminals 12 of the power storage devices 11 to which the connection bus bars 13 and the output bus bars 14 are connected. The potential of the electrode terminal 12 connected to the output bus bar 14 having the numeral "1" appended thereto is the highest, and the potentials decrease in order from "1" to "13", the potential of the electrode terminal 12 connected to the output bus bar 14 having the numeral "13" appended thereto being the lowest.

As shown in FIG. 1, the ranks of the potentials of the first electrode terminals 12A connected to the output bus bars 14 and the connection bus bars 13 disposed on the left end portions of the plurality of power storage devices 11 aligned in the front-rear direction are "1", "3", "5", "7", "9", "11", and "13" in order from the highest potential. The ranks of the potentials of the second electrode terminals 12B connected to the connection bus bars 13 disposed on the right end portions of the plurality of power storage devices 11 are "2", "4", "6", "8", "10", and "12" in order from the highest potential.

The power storage module 10 is connected to an external ECU (Electronic Control Unit) or the like (not shown) via a connector 37. The ECU has a microcomputer, devices, and the like mounted therein, and has a known configuration including functions for detecting the voltage, the current, the temperature, and the like of each power storage device 11, charge/discharge control of the power storage devices 11, and the like.

Wiring Module

As shown in FIG. 1, the wiring module 20 is placed on the upper surfaces of the plurality of power storage devices 11. The wiring module 20 according to the present embodiment includes a substrate 21 that is flexible and has a plurality of first voltage detection lines 23 and a plurality of second voltage detection lines 24 on only one surface thereof, and the connector 37 to which the substrate 21 is connected.

Figure 2:
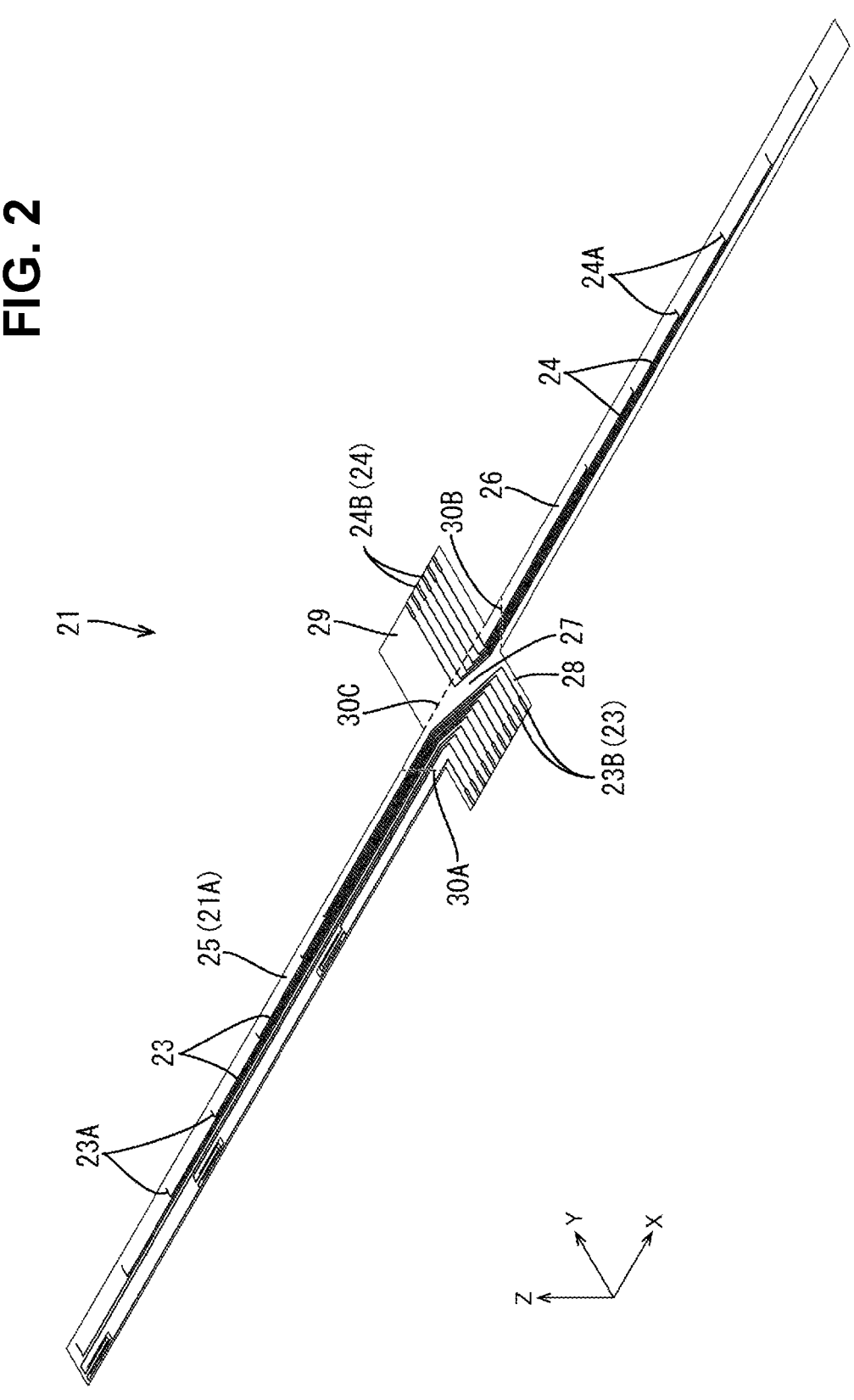
FIG. 2 is a plan view of a substrate in a state of not being folded along a first fold portion or a second fold portion.
Figure 3:
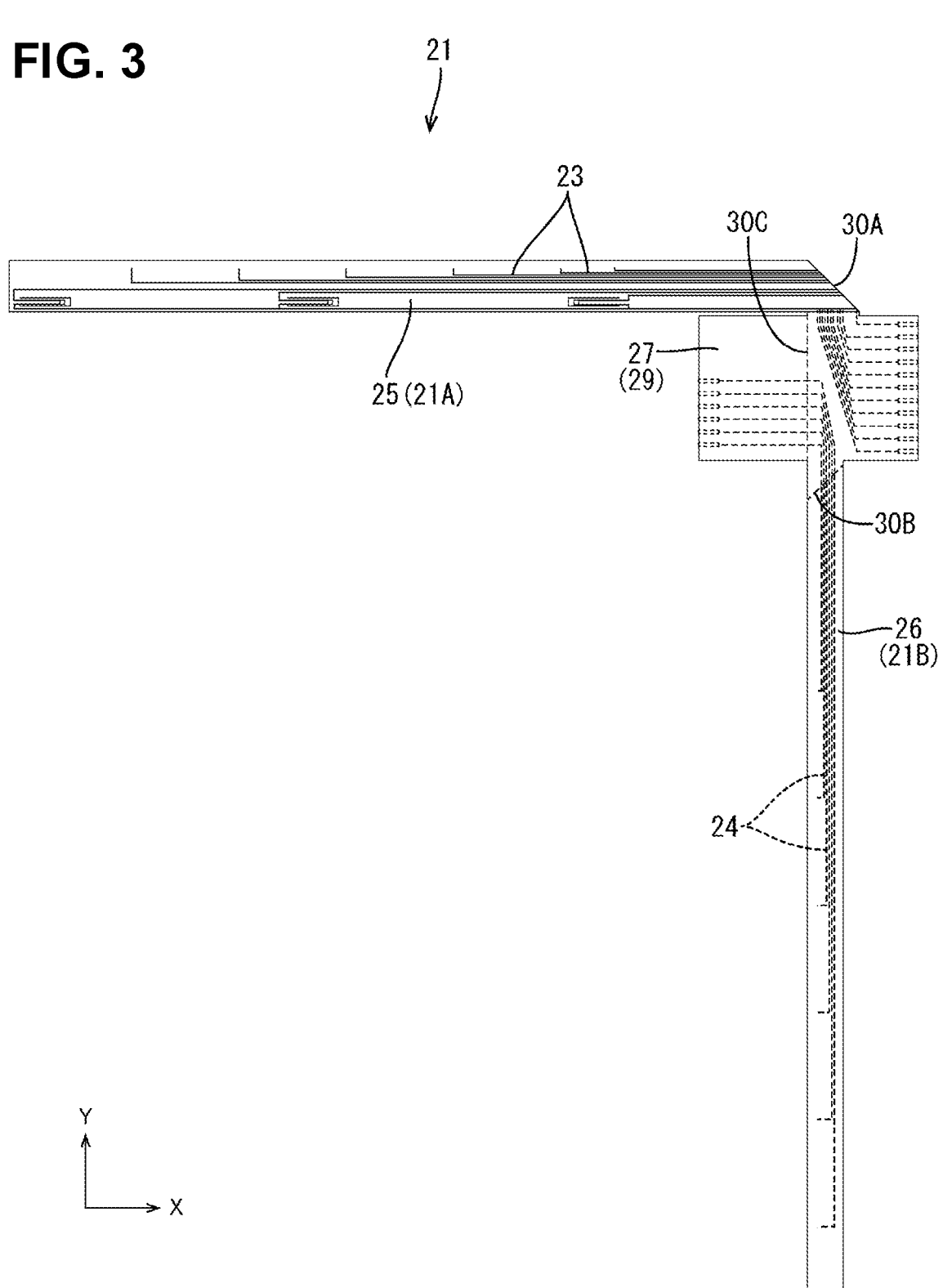
FIG. 3 is a plan view of the substrate in a state of being mountain-folded along the first fold portion.

As shown in FIG. 2, the substrate 21 is configured by forming the plurality of first voltage detection lines 23 and the plurality of second voltage detection lines 24 on only a surface 21A of a flexible insulative sheet using printed wiring technology. As shown in FIG. 3, no conductive path is provided on a back surface 21B of the substrate 21. Note that, on the back surface 21B of the substrate 21, the plurality of first voltage detection lines 23 and the second voltage detection lines 24 disposed on the surface 21A of the substrate 21 are shown with broken lines. The substrate 21 according to the present embodiment is a flexible printed substrate.

First Connection Piece, Second Connection Piece, and Connector Connection Piece

As shown in FIG. 1, the substrate 21 includes a first connection piece 25 extending in the front-rear direction, a second connection piece 26 extending in the front-rear direction separated from the first connection piece 25 in the left-right direction, and a connector connection piece 27 positioned between the first connection piece 25 and the second connection piece 26. The substrate 21 includes a first fold portion 30A in the first connection piece 25 along which the plurality of first voltage detection lines 23 are folded, a second fold portion 30B in the second connection piece 26 along which the plurality of second voltage detection lines 24 are folded, and a third fold portion 30C in the connector connection piece 27 along which the plurality of second voltage detection lines 24 are folded.

First Voltage Detection Lines and Second Voltage Detection Lines

As shown in FIG. 1, a plurality of (in the present embodiment, seven) first voltage detection lines 23 are formed on the first connection piece 25 and the connector connection piece 27, and a plurality of (in the present embodiment, six) second voltage detection lines 24 are formed on the second connection piece 26 and the connector connection piece 27.

Ends on One Side of Second Voltage Detection Lines

Figure 4:
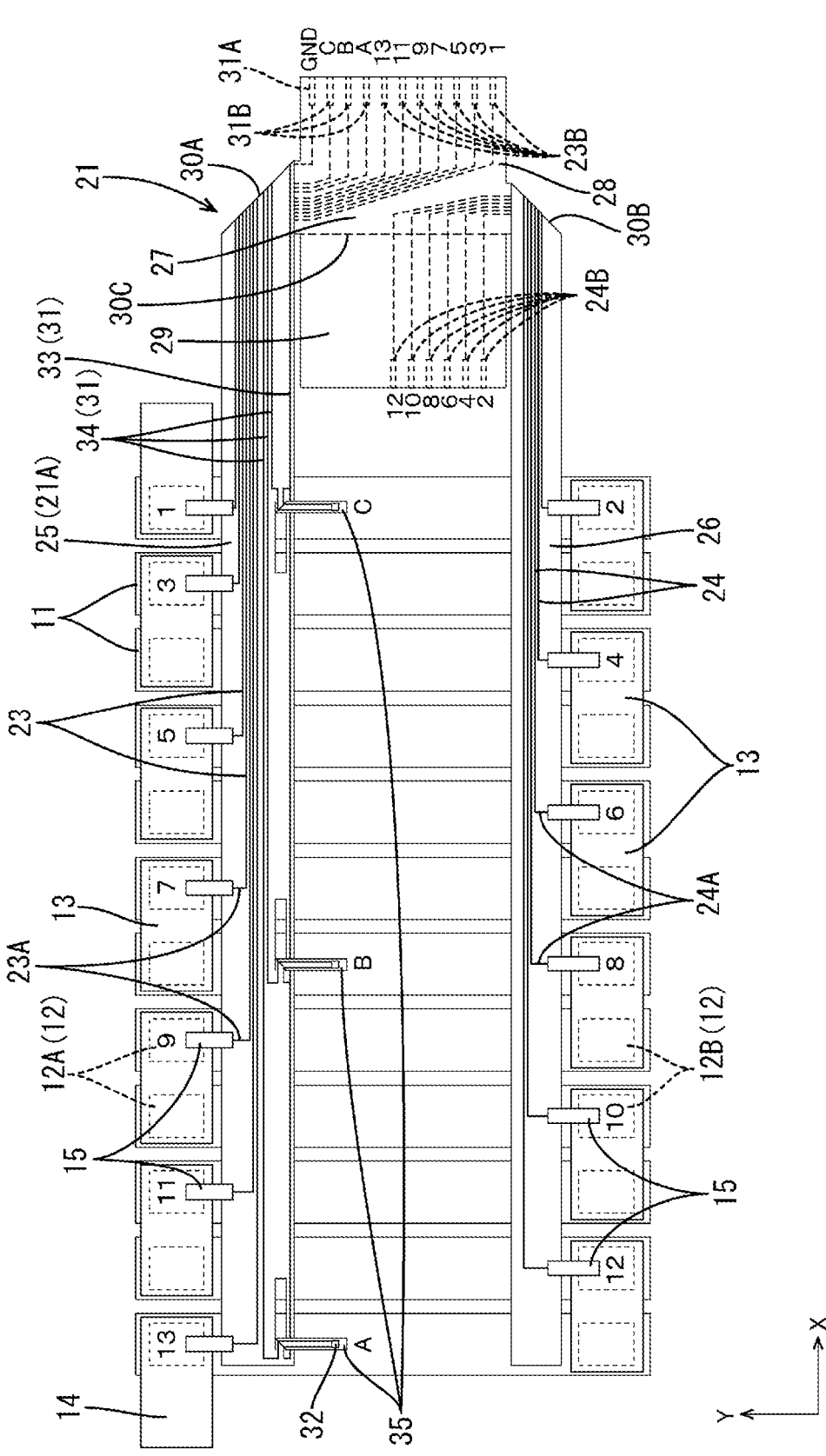
FIG. 4 is a plan view showing connection between the substrate and a plurality of power storage devices.

As shown in FIG. 4, on the second connection piece 26, the plurality of second voltage detection lines 24 extend substantially in the front-rear direction, and are aligned at intervals in the left-right direction. The rear end portions of the second voltage detection lines 24 are ends 24A on one side of the second voltage detection lines 24. The ends 24A on the one side of the second voltage detection lines 24 are provided on the right side of the second connection piece 26, separated in the front-rear direction, and are electrically connected to the connection bus bars 13 connected to the second electrode terminals 12B. The second voltage detection lines 24 can be electrically connected to the connection bus bars 13 by employing a suitable technique such as soldering or welding. In the present embodiment, the second voltage detection lines 24 are connected to the connection bus bars 13 via metal pieces 15 made of nickel or the like. The ends 24A on the one side of the second voltage detection lines 24 are connected to the metal pieces 15 through soldering, and the connection bus bars 13 are connected to the metal pieces 15 through welding.

Ends on One Side of First Voltage Detection Lines

As shown in FIG. 4, on the first connection piece 25, the plurality of first voltage detection lines 23 extend substantially in the front-rear direction, and are aligned at intervals in the left-right direction. The rear end portions of the first voltage detection lines 23 are ends 23A on one side of the first voltage detection lines 23. The ends 23A on the one side of the first voltage detection lines 23 are provided at intervals in the front-rear direction, on the left side of the first connection piece 25, and are connected, via the metal pieces 15, to the connection bus bars 13 and the output bus bars 14 connected to the first electrode terminals 12A.

Ends on Other Side of First Voltage Detection Lines and Ends on Other Side of Second Voltage Detection Lines As shown in FIG. 4, the connector connection piece 27 includes ends 23B on the other side of the first voltage detection lines 23 that are opposite to the ends 23A on the one side of the first voltage detection lines 23 and ends 24B on the other side of the second voltage detection lines 24 that are opposite to the ends 24A on the one side of the second voltage detection lines 24. The ends 23B on the other side of the first voltage detection lines 23 and the ends 24B on the other side of the second voltage detection lines 24 are electrically connected to the connector 37 (see FIG. 7). In the present embodiment, the first voltage detection lines 23 and the second voltage detection lines 24 are connected to the connector 37 through soldering.

The first fold portion 30A, the second fold portion 30B, and the third fold portion 30C of the substrate 21 will be described below, after which the arrangement of the plurality of first voltage detection lines 23 and the plurality of second voltage detection lines 24 will be described.

FIG. 2 shows the substrate 21 in a state of not being folded along any of the first fold portion 30A, the second fold portion 30B, and the third fold portion 30C. In FIG. 2, the connector connection piece 27 includes a first protruding piece 28 that protrudes rightward relative to the first connection piece 25, and a second protruding piece 29 that protrudes leftward relative to the second connection piece 26. The plurality of first voltage detection lines 23 that are disposed on the first protruding piece 28 and the plurality of second voltage detection lines 24 that are disposed on the second protruding piece 29 extend substantially in the left-right direction, and are disposed orthogonally to a direction (front-rear direction) in which the plurality of first voltage detection lines 23 disposed on the first connection piece 25 and the plurality of second voltage detection lines 24 disposed on the second connection piece 26 extend. The ends 23B on the other side of the first voltage detection lines 23 are disposed on a right end portion of the first protruding piece 28. The ends 24B on the other side of the second voltage detection lines 24 are disposed on a left end portion of the second protruding piece 29.

As shown in FIG. 2, at a portion of the first connection piece 25 that is close to the connector connection piece 27, the first fold portion 30A is provided spanning the entire width in the left-right direction of the first connection piece 25. The first fold portion 30A is a fold line that extends at an angle of 45° relative to a direction in which the first connection piece 25 extends. The first connection piece 25 is mountain-folded along the first fold portion 30A (see FIGS. 2 and 3). Here, mountain-folding is folding the first connection piece 25 such that the fold line is disposed on the outside of the fold of the first connection piece 25.

FIG. 3 shows the substrate 21 in a state of being folded along the first fold portion 30A. In FIG. 3, at a portion of the second connection piece 26 that is close to the connector connection piece 27, the second fold portion 30B is provided spanning the entire width in the front-rear direction of the second connection piece 26. The second fold portion 30B is a fold line that extends at an angle of 45° relative to a direction in which the second connection piece 26 extends. The second connection piece 26 is valley-folded along the second fold portion 30B (see FIGS. 3 and 4). Here, valley-folding is folding the second connection piece 26 such that the fold line is disposed on the inside of the fold of the second connection piece 26. It should be noted that the second connection piece 26 is mountain-folded along the second fold portion 30B as seen in the comparison between FIGS. 2 and 4.

FIG. 4 shows the substrate 21 in a state of being folded along the first fold portion 30A and the second fold portion 30B. In FIG. 4, in the connector connection piece 27, the third fold portion 30C is provided spanning the entire width in the left-right direction of the connector connection piece 27. The third fold portion 30C is a fold line that extends at an angle of 90° relative to a direction in which the connector connection piece 27 extends (front-rear direction). The connector connection piece 27 is mountain-folded along the third fold portion 30C (FIGS. 1 and 4). As a result of the connector connection piece 27 being folded along the third fold portion 30C, the first protruding piece 28 and the second protruding piece 29 overlap each other in the up-down direction (see FIG. 7).

As shown in FIG. 4, the plurality of first voltage detection lines 23 are folded along the first fold portion 30A, and the first voltage detection lines 23 are folded once overall. Accordingly, the ends 23A on the one side of the first voltage detection lines 23 are disposed on the upper surface (on the near side in the vertical direction in FIG. 4) of the first connection piece 25, while the ends 23B on the other side of the first voltage detection lines 23 are disposed on the lower surface (on the farther side in the vertical direction in FIG. 4) of the first protruding piece 28. In addition, the first fold portion 30A is a fold line that extends at an angle of 45° relative to a direction in which the first connection piece 25 extends, and thus a direction in which the first voltage detection lines 23 extend on the rear side of the first connection piece 25 relative to the first fold portion 30A and a direction in which the first voltage detection lines 23 extend on the first protruding piece 28 are both substantially the front-rear direction.

Figure 7:
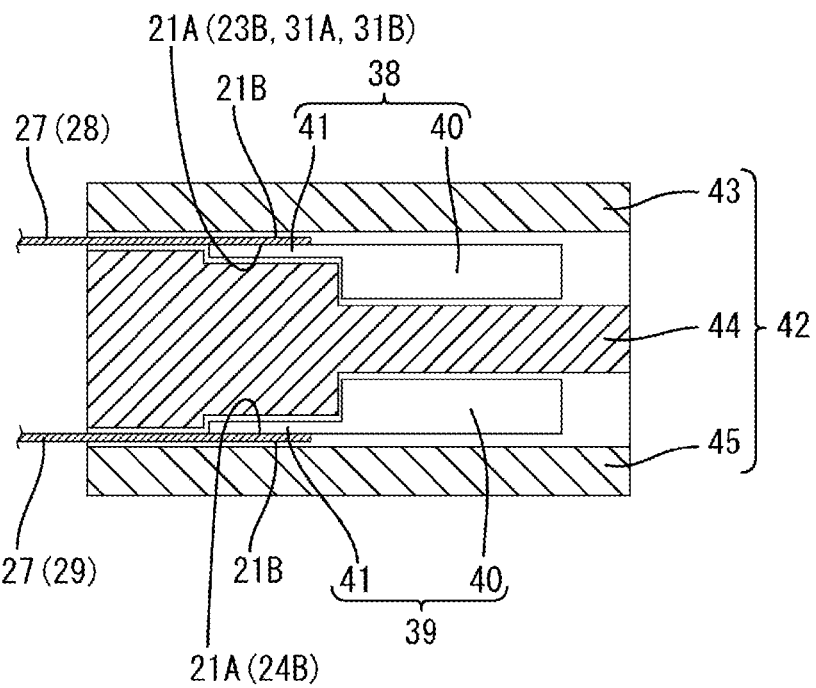
FIG. 7 is a schematic diagram of a cross-section taken along line A-A in FIG. 1.

As shown in FIG. 4, in a state where the plurality of second voltage detection lines 24 are folded along only the second fold portion 30B, the ends 24A on the one side of the second voltage detection lines 24 are disposed on the upper side (on the near side in the vertical direction in FIG. 4) of the second connection piece 26, while the ends 24B on the other side of the second voltage detection lines 24 are disposed on the lower surface (on the farther side in the vertical direction in FIG. 4) of the second protruding piece 29. In a state where the plurality of second voltage detection lines 24 are folded along the second fold portion 30B and the third fold portion 30C as shown in FIG. 1, the plurality of second voltage detection lines 24 are additionally folded once from the state in FIG. 4. For this reason, as shown in FIG. 7, the ends 24B on the other side of the second voltage detection lines 24 are disposed on the upper surface of the second protruding piece 29. In addition, as shown in FIG. 4, the second fold portion 30B is a fold portion that extends at an angle of 45° relative to a direction in which the second connection piece 26 extends, and thus a direction in which the second voltage detection lines 24 extend on the rear side of the second connection piece 26 relative to the second fold portion 30B and a direction in which the second voltage detection lines 24 extend on the second protruding piece 29 are both substantially the front-rear direction.

In FIG. 4, numerals appended to the ends 23B on the other side of the first voltage detection lines 23 indicate the potentials of the connection bus bars 13 and the output bus bars 14 (the first electrode terminals 12A) to which the first voltage detection lines 23 are respectively connected. The ends 23B on the other side of the first voltage detection lines 23 are disposed close together from the right end of the first protruding piece 28, and are aligned in the left-right direction in descending order of potential, that is to say, in the order of "1", "3", "5", "7", "9", "11", and "13", toward the left. The potential of the first voltage detection line 23 to which "13" is appended is the lowest compared with the potentials of the other first voltage detection lines 23 and the second voltage detection lines 24. The potential of the first voltage detection line 23 to which "13" is appended serves as a reference in the power storage module 10 according to the present embodiment, and may be 0 V. If the power storage module 10 according to the present embodiment and another power storage module 10 are connected in series, the potential of the first voltage detection line 23 to which "13" is appended is based on a relative difference in potential from the other power storage module 10, and thus may be higher than 0 V.

In FIG. 4, numerals appended to the ends 24B on the other side of the second voltage detection lines 24 indicate the potentials of the connection bus bars 13 (the second electrode terminals 12B) to which the second voltage detection lines 24 are connected. The ends 24B on the other side of the second voltage detection lines 24 are aligned in the left-right direction in descending order of potential, that is to say, in the order of "2", "4", "6", "8", "10", and "12", toward the left.

Plurality of Thermistor Circuits

As shown in FIG. 4, the substrate 21 according to the present embodiment further includes a plurality of (in the present embodiment, three) thermistor circuits 31 serving as conductive paths in addition to the first voltage detection lines 23 and the second voltage detection lines 24. The plurality of thermistor circuits 31 are circuits for measuring the temperatures of the power storage devices 11, and are formed only on the surface 21A of the substrate 21 using printed wiring technology, similarly to the first voltage detection lines 23 and the second voltage detection lines 24. The plurality of thermistor circuits 31 are disposed on the right side of the first connection piece 25 and on the left side of the first protruding piece 28.

Figure 6:
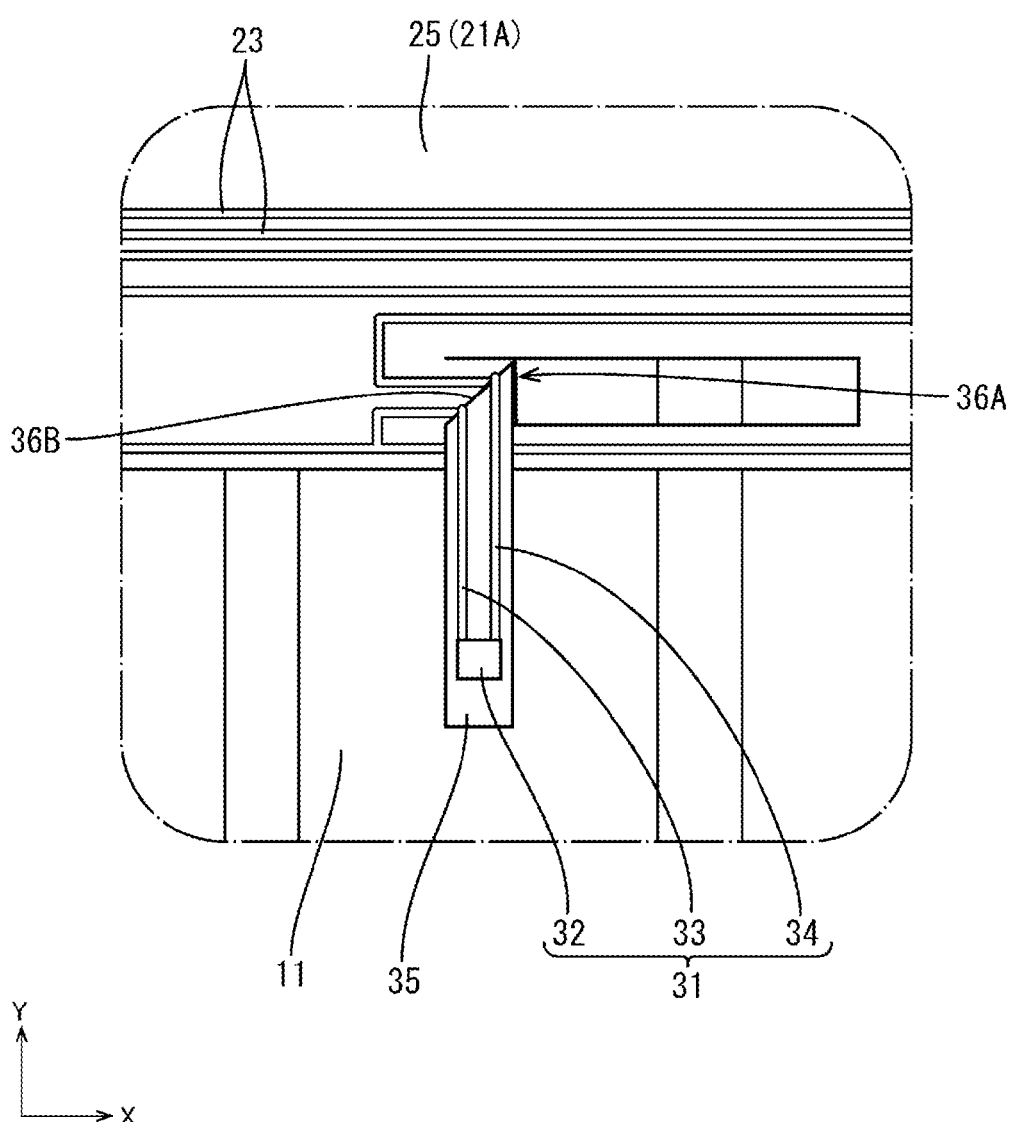
FIG. 6 is an enlarged plan view of a power storage module, showing a temperature measuring piece disposed at an intermediate position between power storage devices, and a surrounding region of the temperature measuring piece.

As shown in FIG. 6, each thermistor circuit 31 includes a thermistor 32, a ground conductive path 33 that is led out from the thermistor 32 to a common ground potential, and a temperature measuring conductive path 34 that is led out from the thermistor 32, and is different from the ground conductive path 33. As shown in FIG. 4, the front end portion of a ground conductive path 33 is an end 31A on one side of the thermistor circuits 31, and the front end portions of the temperature measuring conductive paths 34 are ends 31B on the other side of the thermistor circuits 31.

Figure 5:
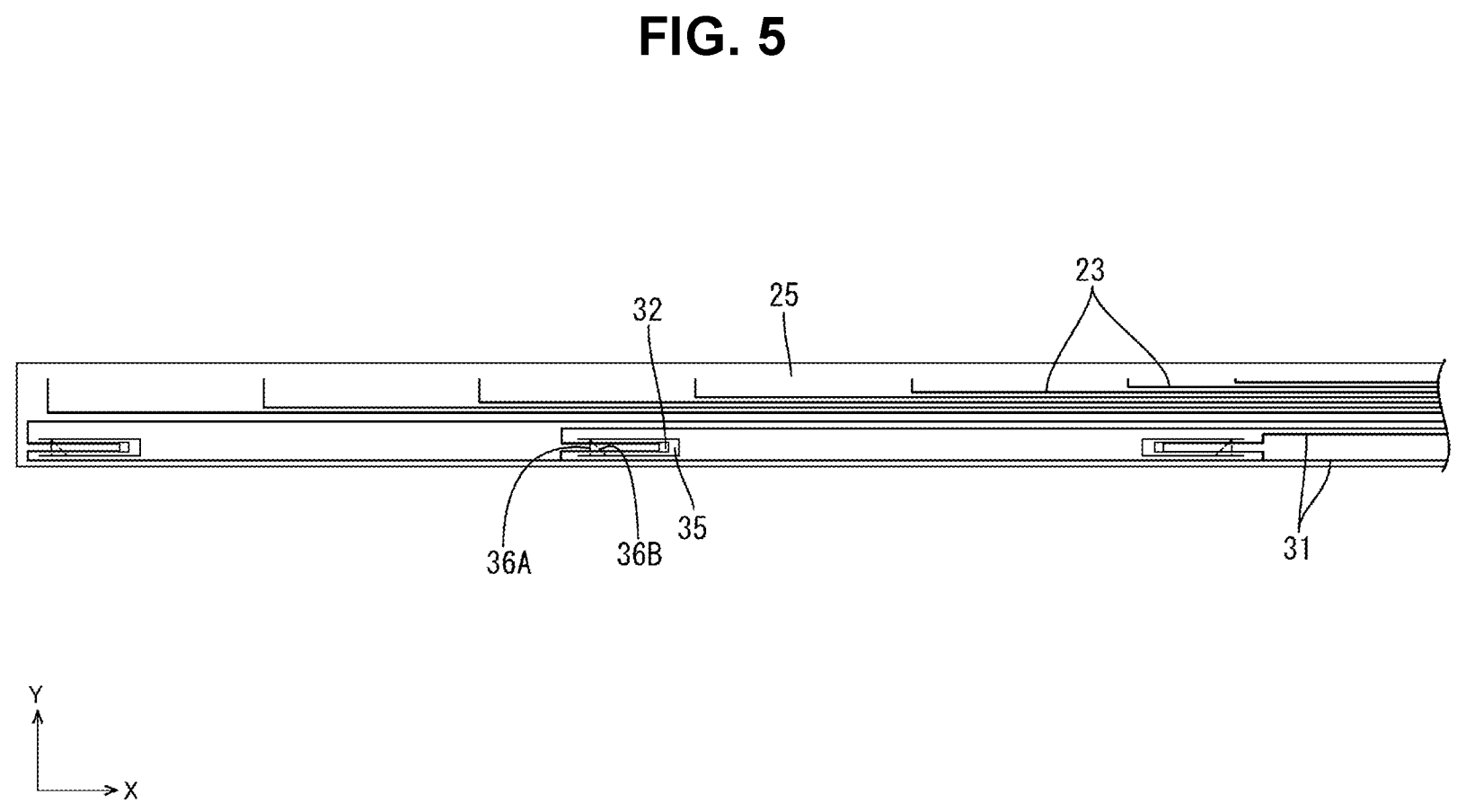

As shown in FIG. 4, a portion of a circuit that includes the thermistor 32 of the thermistor circuit 31 is disposed on a temperature measuring piece 35 provided on the first connection piece 25. The temperature measuring pieces 35 are respectively provided on a rear portion and a front portion of the first connection piece 25, and on an intermediate portion therebetween. Each temperature measuring piece 35 is formed by making a cut in the first connection piece 25, and folding the cut portion toward a central portion in the left-right direction of the corresponding power storage device 11. As shown in FIGS. 5 and 6, specifically, the temperature measuring piece 35 includes two temperature measuring piece fold portions, namely temperature measuring piece fold portions 36A and 36B, and is valley-folded along the temperature measuring piece fold portion 36A and mountain-folded along the temperature measuring piece fold portion 36B. With such a configuration, as shown in FIG. 4, the plurality of thermistor circuits 31 make it possible to measure the temperatures in the vicinities of central portions in the left-right direction of the upper surfaces of the frontmost, rearmost, and intermediate power storage devices 11, among the plurality of power storage devices 11.

As shown in FIG. 4, on the substrate 21, the plurality of thermistor circuits 31 are routed substantially in parallel with the plurality of first voltage detection lines 23 and are folded along the first fold portion 30A, similarly to the plurality of first voltage detection lines 23. The end 31A on the one side of the thermistor circuit 31 that is connected to the ground potential is disposed on the left side of the first protruding piece 28. The reference sign "GND" (in FIG. 8, "G") indicating a ground potential is appended to the end 31A on the one side of the thermistor circuit 31. The potential of the end 31A on the one side of the thermistor circuit 31 is the ground potential, that is to say, 0 V. The ends 31B on the other side of the thermistor circuits 31 are disposed on the right side of the end 31A on one side of the thermistor circuit 31. The reference signs "C", "B", and "A" are appended to the ends 31B on the other side of the thermistor circuits 31 in order from the left, corresponding to the thermistors 32 disposed on the frontmost, intermediate, and rearmost power storage devices 11, respectively. The potential of the ends 31B on the other side of the thermistor circuits 31 depends on the resistance values of the thermistors 32.

As shown in FIG. 4, on the first protruding piece 28, the ends 31B on the other side of the plurality of thermistor circuits 31 to which the reference signs "A", "B", and "C" are appended are disposed between the end 31A on the one side of the thermistor circuit 31 to which the reference sign "GND" (ground potential) is appended, and the end 23B on the other side of the first voltage detection line 23 to which "13" is appended and that has the lowest potential. The potentials of the ends 31B on the other side of the thermistor circuits 31 are relatively close to the potential of the end 23B on the other side of the first voltage detection line 23 that is the lowest, and thus it is possible to suppress short-circuiting between the thermistor circuits 31 and the first voltage detection lines 23.

Connector

As shown in FIG. 7, the first protruding piece 28 and the second protruding piece 29 are connected to the connector 37 from the rear side (an example of the same side in the aligning direction). A surface (the surface 21A) of the first protruding piece 28 on which the ends 23B on the other side of the first voltage detection lines 23 are provided and a surface (the surface 21A) of the second protruding piece 29 on which the ends 24B on the other side of the second voltage detection lines 24 are provided face each other in the up-down direction.

As shown in FIG. 7, the connector 37 according to the present embodiment is a connector for a flexible printed substrate, and includes first terminals 38 that are connected to the first protruding piece 28, second terminals 39 that are connected to the second protruding piece 29, and a housing 42 that accommodates the first terminals 38 and the second terminals 39. In the present embodiment, the first terminals 38 and the second terminals 39 are female terminals. The first terminals 38 and the second terminals 39 each include a tubular connection portion 40 that is connected to a male terminal of a partner connector (not shown), and a substrate connection portion 41 that is continuous to the tubular connection portion 40 on the rear side thereof. The substrate connection portion 41 of each first terminal 38 is connected to the end 23B on the other side of a first voltage detection line 23, the end 31A on the one side of a thermistor circuit 31, or the end 31B on the other side of a thermistor circuit 31 through soldering. The substrate connection portions 41 of the second terminals 39 are connected to the ends 24B on the other side of the second voltage detection lines 24 through soldering.

As shown in FIG. 7, for example, the housing 42 includes a separate upper housing 43, a lower housing 45, and an intermediate housing 44 disposed therebetween. The upper housing 43 constitutes the outer surface on the upper side of the housing 42, and the lower housing 45 constitutes the outer surface on the lower side of the housing 42. The intermediate housing 44 engages with and retains the first terminals 38 and the second terminals 39, inside the housing 42. Although a detailed description is omitted, the connector 37 can be configured by attaching the upper housing 43, the first protruding piece 28 connected to the first terminals 38 through soldering in advance, the intermediate housing 44, the second protruding piece 29 connected to the second terminals 39 through soldering in advance, and the lower housing 45 to one another in a layered manner in the up-down direction, for example.

Figure 8:
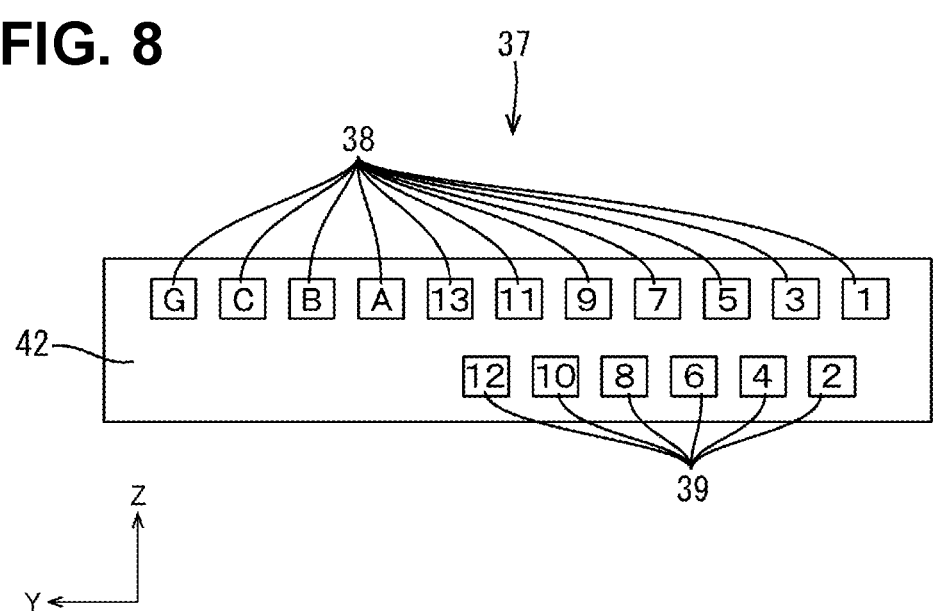
FIG. 8 is a schematic diagram of a connector as viewed from the rear.

FIG. 8 is a rear view of the connector 37 schematically showing the arrangement of the first terminals 38 and the second terminals 39 on the connector 37. The numerals "1" to "13" appended inside the square frames indicating the first terminals 38 and the second terminals 39 represent the ranks of the potentials of the first terminals 38 and the second terminals 39, and correspond to the numerals appended to the connection bus bars 13 and the output bus bars 14 in FIG. 1. Similarly, the reference signs "G", "C", "B", and "A" appended to the first terminals 38 in FIG. 8 correspond to the reference signs "GND", "C", "B", and "A" appended to the end 31A on the one side of the thermistor circuit 31 and the ends 31B on the other side of the thermistor circuits 31 in FIG. 4.

As shown in FIG. 8, on the upper side of the connector 37, the first terminals 38 are aligned in a row in the left-right direction in the order of potential. On the lower side of the connector 37, the second terminals 39 are aligned in a row in the left-right direction in the order of potential. As a result of the first terminals 38 and the second terminals 39 being displaced relative to each other in the up-down direction (an example of a direction orthogonal to the aligning direction and the separation direction) and the connector 37 having a two-level configuration in this manner, the size of the connector 37 can be reduced in the left-right direction. Particularly when the number of power storage devices 11 to which the wiring module 20 is applied is large, the number of first voltage detection lines 23 and second voltage detection lines 24 is large, and thus there are cases where a two-level configuration such as that of the connector 37 is preferable.

In FIG. 8, each second terminal 39 is disposed at an intermediate position between first terminals 38 that are adjacent in the left-right direction, the second terminals 39 being connected to a potential therebetween. The second terminal 39 to which "6" is appended is disposed at an intermediate position in the left-right direction between the first terminals 38 to which "5" and "7" are appended, for example. As a result of the first terminals 38 and the second terminals 39 being displaced relative to each other in the left-right direction in this manner, the first terminals 38 and the second terminals 39 can be aligned in a zig-zag manner in the left-right direction in the order of potential, on the connector 37 as a whole (that is to say, including the upper level and the lower level).

In addition, positions at which the first terminals 38 and the second terminals 39 are disposed in the left-right direction may be aligned (not illustrated) unlike the arrangement in FIG. 8. A configuration may also be adopted in which, for example, the first terminal 38 to which "1" is appended and the second terminal 39 to which "2" is appended are disposed at the same position in the left-right direction, and the first terminal 38 to which "3" is appended and the second terminal 39 to which "4" is appended are disposed at the same position in the left-right direction.

Operations and Effects of First Embodiment

According to the first embodiment, the following operations and effects are achieved.

The wiring module 20 according to the first embodiment is a wiring module 20 that is attached to the plurality of power storage devices 11, the electrode terminals 12 of the plurality of power storage devices 11 being arranged in two rows continuously in the front-rear direction, and the two rows of electrode terminals 12 being separated from each other in the left-right direction, the wiring module 20 including: the single substrate 21 that is flexible and has the plurality of first voltage detection lines 23 and the plurality of second voltage detection lines 24 on only one surface thereof, and the connector 37, the substrate 21 includes: the first connection piece 25 that includes the ends 23A on the one side of the first voltage detection lines 23 that are electrically connected to the first electrode terminals 12A that form one row of the two rows of electrode terminals 12, the second connection piece 26 that includes the ends 24A on the one side of the second voltage detection lines 24 that are electrically connected to the second electrode terminals 12B that form the other row of the two rows, and the connector connection piece 27 that includes the ends 23B on the other side of the first voltage detection lines 23 and the ends 24B on the other side of the second voltage detection lines 24 that are electrically connected to the connector 37, and is disposed between the first connection piece 25 and the second connection piece 26, the ends 23B on the other side of the first voltage detection lines 23 are aligned in the left-right direction in the order of potentials of the first electrode terminals 12A electrically connected thereto via the first voltage detection lines 23, the ends 24B on the other side of the second voltage detection lines 24 are aligned in the left-right direction in the order of potentials of the second electrode terminals 12B electrically connected thereto via the second voltage detection lines 24, the plurality of second voltage detection lines 24 are folded once on the connector connection piece 27, and the first voltage detection lines 23 and the second voltage detection lines 24 are connected to the connector 37 from the rear side.

According to the above configuration, the substrate 21 includes the plurality of first voltage detection lines 23 and the plurality of second voltage detection lines 24 on only one surface thereof, and thus, a flexible substrate that has conductive paths formed only on one surface thereof (flexible printed substrate) can be used as the substrate 21, and it is possible to reduce the manufacturing cost of the wiring module 20. On the connector connection piece 27, the plurality of second voltage detection lines 24 are folded once, and thus the ends 23B on the other side of the first voltage detection lines 23 and the ends 24B on the other side of the second voltage detection lines 24 can be aligned in the left-right direction in the order of potentials of the electrode terminals 12 to which the first voltage detection lines 23 and the second voltage detection lines 24 are respectively connected.

In the first embodiment, both the first connection piece 25 and the second connection piece 26 are folded once (except for the folding of the substrate 21 along the temperature measuring piece fold portions 36A and 36B).

The substrate 21 of the wiring module 20 includes the first connection piece 25 and the second connection piece 26 that extend rearward from the connector connection piece 27 and are disposed separated from each other in the left-right direction, and has a shape with many irregularities overall. Assuming that the first connection piece and the second connection piece are configured without the first fold portion and the second fold portion respectively, the number of substrates having many irregularities that are obtained from a standard-size substrate through punchcutting is small. On the other hand, in the first embodiment, both the first connection piece 25 and the second connection piece 26 of the wiring module 20 are folded once. In addition, the substrate 21 in a state of not being folded (see FIG. 2) has a shape with comparatively few irregularities, and thus it is possible to increase the number of unfolded substrates 21 that are obtained from a standard-size substrate through punchcutting. Therefore, according to the above configuration, the shape of the substrate 21 can be easily controlled while suppressing the manufacturing cost of the substrate 21.

In the first embodiment, the surface of the substrate 21 on which the ends 23B on the other side of the first voltage detection lines 23 are disposed and the surface of the substrate 21 on which the ends 24B on the other side of the second voltage detection lines 24 are disposed face each other.

According to the above configuration, the substrate 21 can be easily mounted to the connector 37.

In the first embodiment, the connector 37 includes the first terminals 38 that are connected to the ends 23B on the other side of the first voltage detection lines 23, and the second terminals 39 that are connected to the ends 24B on the other side of the second voltage detection lines 24, and the first terminals 38 are aligned in a row in the left-right direction, and the second terminals 39 are disposed at different positions from the first terminal 38 in the up-down direction, and are aligned in a row in the left-right direction.

According to the above configuration, the size of the connector 37 can be reduced in the left-right direction.

Second Embodiment

A second embodiment of the present disclosure will be described with reference to FIG. 9. A configuration according to the second embodiment is the same as the configuration according to the first embodiment except that a connector 137 has a single-level configuration. Hereinafter, the same members as those in the first embodiment are given the same reference numerals used in the first embodiment, and a description of the same configurations, operations, and effects as those in the first embodiment is omitted.

Figure 9:
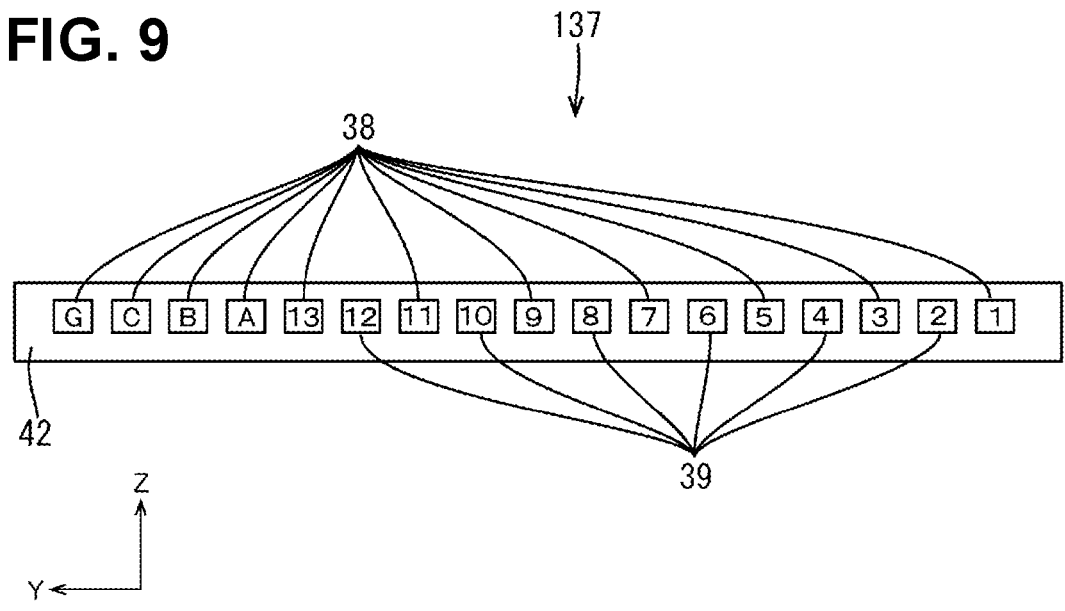
FIG. 9 is a schematic diagram of a connector according to a second embodiment as viewed from the rear.

FIG. 9 is a rear view of the connector 137 schematically showing the arrangement of the first terminals 38 and the second terminals 39 on the connector 137 according to the second embodiment. Unlike the connector 37 according to the first embodiment (see FIGS. 7 and 8), the connector 137 is configured by aligning the first terminals 38 and the second terminals 39 in a single row in the left-right direction. That is to say, the connector 137 has a single-level arrangement. By adopting the single-level arrangement, the size of the connector 137 can be reduced in the up-down direction. Particularly when the number of power storage devices 11 to which the wiring module 20 is applied is small, the number of first voltage detection lines 23 and second voltage detection lines 24 is small, and thus there are cases where a single-level configuration such as that of the connector 137 can be adopted.

As shown in FIG. 9, on the connector 137, the first terminals 38 and the second terminals 39 are alternately disposed in the left-right direction, and the first terminals 38 and the second terminals 39 are aligned in the left-right direction in the order of potential. In other words, the first terminals 38 and the second terminals 39 are aligned in descending order of potential, that is to say, in the order of "1", "2", "3", "4", "5", "6", "7", "8", "9", "10", "11", "12", and "13, toward the left.

Operations and Effects of Second Embodiment

According to the second embodiment, the following operations and effects are achieved.

In the second embodiment, the connector 137 includes the first terminals 38 that are connected to the ends 23B on the other side of the first voltage detection lines 23 and the second terminals 39 that are connected to the ends 24B on the other side of the second voltage detection lines 24, the first terminals 38 and the second terminals 39 are aligned in a row in the left-right direction, and the first terminals 38 and the second terminals 39 are disposed alternately in the left-right direction, and are aligned in the order of potential.

According to the above configuration, the size of the connector 137 can be reduced in the up-down direction.

Third Embodiment

A third embodiment of the present disclosure will be described with reference to FIG. 10. The configuration of a wiring module 120 of a power storage module 110 according to the third embodiment is the same as the configuration of the wiring module 20 according to the first embodiment except that a protector 50 is provided. Hereinafter, the same members as those in the first embodiment are given the same reference numerals used in the first embodiment, and a description of the same configurations, operations, and effects as those in the first embodiment is omitted.

Figure 10:
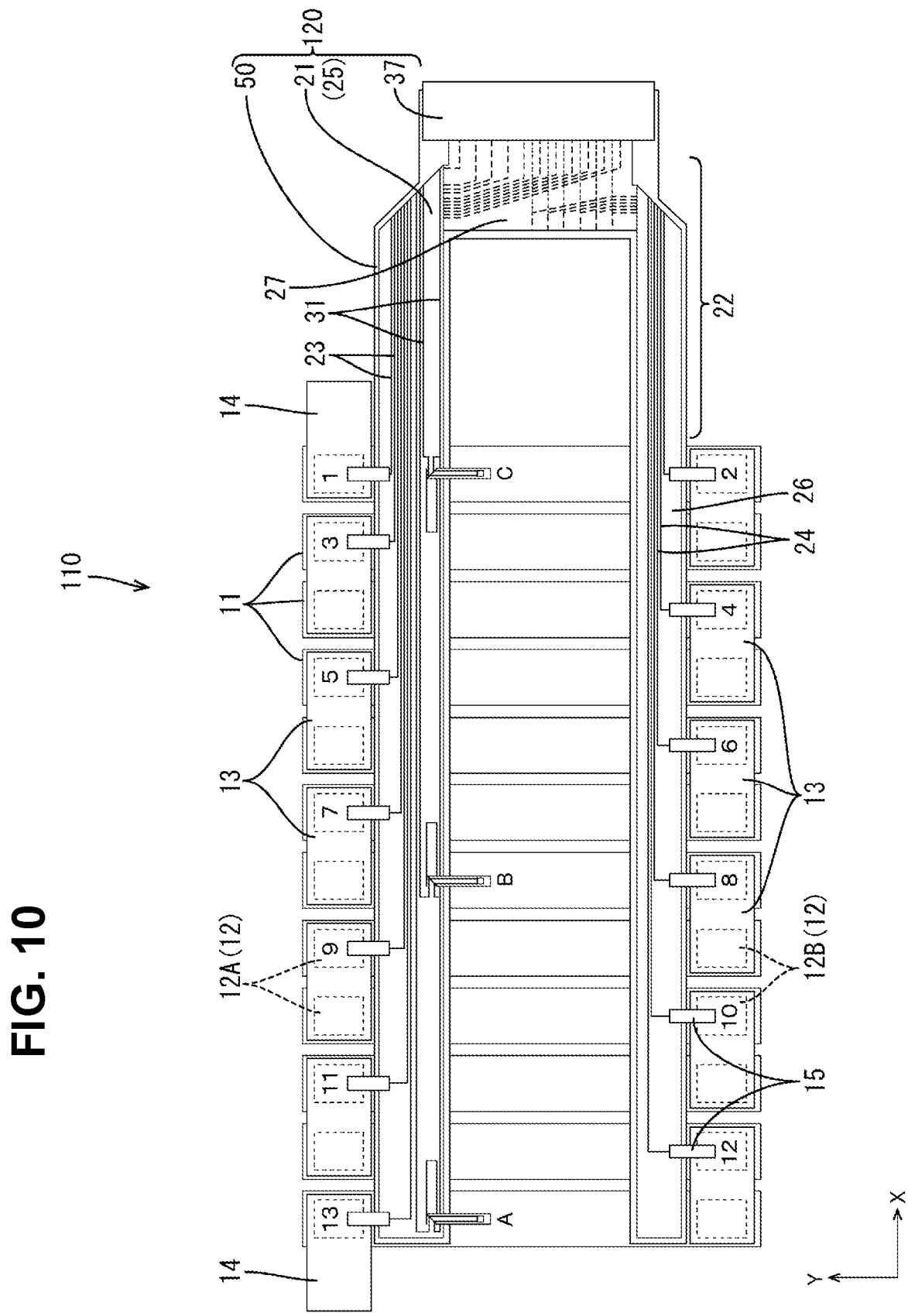
FIG. 10 is a plan view of a power storage module according to a third embodiment.

As shown in FIG. 10, the protector 50 is a plate-like member made of an insulative synthetic resin. The protector 50 is configured to hold the substrate 21 and the connector 37. Although a state where the protector 50 holds the substrate 21 and the connector 37 is not illustrated, fixing involving an adhesive, engagement that uses an engagement structure, and the like can be adopted, for example.

The wiring module 120 includes the protector 50, and thus members thereof can be protected. In the configuration according to the first embodiment in which no protector 50 is provided, as shown in FIG. 1, a portion of the substrate 21 (hereinafter, referred to as an "extended portion 22") extending on the front side relative to the plurality of power storage devices 11 is exposed to the outside, and is thus likely to be damaged, particularly when subjected to a force from the outside. However, in the third second embodiment, as shown in FIG. 10, the extended portion 22 is protected by the protector 50, and is not exposed to the outside. Therefore, it is possible to suppress damage to the extended portion 22 caused by an external force. In addition, by providing the protector 50, attachment, transportation, and the like of the wiring module 120 are made easy.

Operations and Effects of Third Embodiment

According to the third embodiment, the following operations and effects are achieved.

The wiring module 120 according to the third embodiment includes the protector 50 that protects the substrate 21.

According to the above configuration, it is possible to protect the substrate 21.

Other Embodiments (1) In the above embodiments, the first terminals 38 and the second terminals 39 are female terminals, but there is no limitation thereto, and the first terminals and the second terminals may be male terminals.

(2) In the above embodiments, both the first connection piece 25 and the second connection piece 26 are folded, but there is no limitation thereto, and at least one of the first connection piece and second connection piece does not need to be folded.

(3) In the above embodiments, the surface of the first protruding piece 28 on which the ends 23B on the other side of the first voltage detection lines 23 are disposed (the surface 21A on the first protruding piece 28) and the surface of the second protruding piece 29 on which the ends 24B on the other side of the second voltage detection lines 24 are disposed (the surface 21A on the second protruding piece 29) face each other, but there is no limitation thereto, and the back surface of the first protruding piece and the back surface of the second protruding piece may face each other.

(4) In the above embodiments, the thermistor circuits 31 are provided, but there is no limitation thereto, and no thermistor circuits need to be provided.

(5) In the above embodiments, the connectors 37 and 137 have a configuration in which the separate upper housing 43, the intermediate housing 44, the lower housing 45, the first protruding piece 28 to which the first terminals 38 are connected, and the second protruding piece 29 to which the second terminals 39 are connected are attached to one another in a layered manner, but there is no limitation thereto. A configuration may also be adopted in which, for example, first terminals and second terminals are attached to an integrated housing to configure a connector, and the connector is then mounted to a first protruding piece and a second protruding piece.

(6) In the above embodiments, no reinforcing plate is attached to the opposite surface to the surface of the first protruding piece 28 to which the first terminals 38 are connected (the back surface 21B on the first protruding piece 28) and the opposite surface to the surface of the second protruding piece 29 to which the second terminals 39 are connected (the back surface 21B on the second protruding piece 29), but there is no limitation thereto, and reinforcing plates may be attached to the back surface on the first protruding piece and the back surface on the second protruding piece.

(7) In the above embodiments, the substrate 21 is a flexible printed substrate, but there is no limitation thereto, and the substrate may be a flexible flat cable.

LIST OF REFERENCE NUMERALS 10, 110: Power storage module
11: Power storage device
12: Electrode terminal
12A: First electrode terminal
12B: Second electrode terminal
13: Connection bus bar
14: Output bus bar
15: Metal piece
20, 120: Wiring module
21: Substrate
21A: Surface
21B: Back surface
22: Extended portion
23: First voltage detection line
23A: End on one side
23B: End on other side
24: Second voltage detection line
24A: End on one side
24B: End on other side
25: First connection piece
26: Second connection piece
27: Connector connection piece
28: First protruding piece
29: Second protruding piece
30A: First fold portion
30B: Second fold portion
30C: Third fold portion
31: Thermistor circuit
31A: End on one side
31B: End on other side
32: Thermistor
33: Ground conductive path
34: Temperature measuring conductive path
35: Temperature measuring piece
36A, 36B: Temperature measuring piece fold portion
37, 137: Connector
38: First terminal
39: Second terminal
40: Tubular connection portion
41: Substrate connection portion
42: Housing
43: Upper housing
44: Intermediate housing
45: Lower housing
50: Protector

The invention claimed is:

1. A wiring module that is attached to a plurality of power storage devices, electrode terminals of the plurality of power storage devices being arranged in two rows continuously in an aligning direction of the plurality of power storage devices, and the two rows of electrode terminals being separated from each other in a separation direction that is orthogonal to the aligning direction, the wiring module comprising:

a single substrate that is flexible and has a plurality of first voltage detection lines and a plurality of second voltage detection lines on only one surface thereof; and a connector, wherein the substrate includes:

a first connection piece that includes ends on one side of the first voltage detection lines that are electrically connected to electrode terminals that form one row of the two rows of electrode terminals, a second connection piece that includes ends on one side of the second voltage detection lines that are electrically connected to electrode terminals that form the other row of the two rows, and a connector connection piece that includes ends on the other side of the first voltage detection lines and ends on the other side of the second voltage detection lines that are electrically connected to the connector, and is disposed between the first connection piece and the second connection piece, the ends on the other side of the first voltage detection lines are aligned in the separation direction in an order of potentials of the electrode terminals electrically connected thereto via the first voltage detection lines, the ends on the other side of the second voltage detection lines are aligned in the separation direction in an order of potentials of the electrode terminals electrically connected thereto via the second voltage detection lines, either the plurality of first voltage detection lines or the plurality of second voltage detection lines are folded once on the connector connection piece, and the first voltage detection lines and the second voltage detection lines are connected to the connector from the same side in the aligning direction.

2. The wiring module according to claim 1, wherein at least one of the first connection piece and the second connection piece is folded once or more.

3. The wiring module according to claim 2, wherein the first connection piece and the second connection piece are folded the same number of times.

4. The wiring module according to claim 1, wherein the surface of the substrate on which the ends on the other side of the first voltage detection lines are disposed and the surface of the substrate on which the ends on the other side of the second voltage detection lines are disposed face each other.

5. The wiring module according to claim 1, wherein the connector includes first terminals that are respectively connected to the ends on the other side of the first voltage detection lines and second terminals that are respectively connected to the ends on the other side of the second voltage detection lines, the first terminals are aligned in a row in the separation direction, and the second terminals are disposed at positions different from the first terminals in a direction orthogonal to the aligning direction and the separation direction, and are aligned in a row in the separation direction.

6. The wiring module according to claim 1, wherein the connector includes first terminals that are connected to the ends on the other side of the first voltage detection lines, and second terminals that are connected to the ends on the other side of the second voltage detection lines, the first terminals and the second terminals are aligned in a row in the separation direction, and the first terminals and the second terminals are alternately disposed in the separation direction, and are aligned in an order of potential.

7. The wiring module according to claim 1, further comprising a protector that protects the substrate.

* * * * *